June 6, 1950 S. N. BARUCH 2,510,675
GEARING
Filed Dec. 27, 1948

INVENTOR.
Sydney N Baruch
BY Darby & Darby
ATTORNEYS

Patented June 6, 1950

2,510,675

UNITED STATES PATENT OFFICE 2,510,675

GEARING

Sydney N. Baruch, New York, N. Y.

Application December 27, 1948, Serial No. 67,289

9 Claims. (Cl. 74—440)

1

The present invention relates to improvements in gearing or gear drives and, particularly to a means for providing a cushion packing in the tooth spaces of mating gears thereby rendering it possible to utilize inexpensive gears while at the same time reducing, if not entirely eliminating, the noise produced thereby and eliminating back lash. Additionally, there is a reduction in electrical disturbances produced by the gears and consequent increased difficulty in detecting the presence of instrumentalities utilizing gear drives such, for example, as submarines through the medium of sonic finders.

My invention comprehends the utilization of oil carrying finely divided magnetizable particles such as iron filings surrounding the gears together with a magnetizing influence exerted across the air gap formed by the mating gear teeth. When a mixture of oil and iron filings is subjected to a magnetizing influence it becomes extremely viscous and, in fact, when the magnetization is sufficiently great, substantially a solid. As a result, with my system, the mating gears may be formed with very limited accuracy of tooth shape and in such manner that they would, if run without the oil bath and without the magnetizing influence, be extremely noisy and would produce large amounts of backlash. By utilizing the principles above set forth, the gears have been found by experimentation to operate without backlash and very quietly and at the same time to transmit power with a high degree of efficiency.

The advantages above set forth are, as stated, derived without the utilization of extremely expensive gearing. In the past in large gear reduction sets such, for example, as those used in steamships, in order to provide the requisite accuracy of the gears and at the same time to keep the end thrust on the shafts within suitable limits, it was necessary to utilize that type of gears which is commonly known as "herringbone." Such gears are extremely expensive and must be very carefully machined and finished.

It is an object of my invention to provide a set of mating gears utilizing a magnetic cushion packing in the tooth spaces at or adjacent to the mating point whereby backlash and noise are substantially eliminated.

It is another object of my invention to provide such a magnetic cushion packing the density of which can be regulated by the simple adjustment of the strength of the magnetic field.

It is a further object of my invention to provide simple and economical means for producing a

2 magnetic field in the gap between the mating teeth of a pair of gears.

Other objects and features of the invention will become apparent when the following description is considered in connection with the annexed drawings in which—

Figure 1:
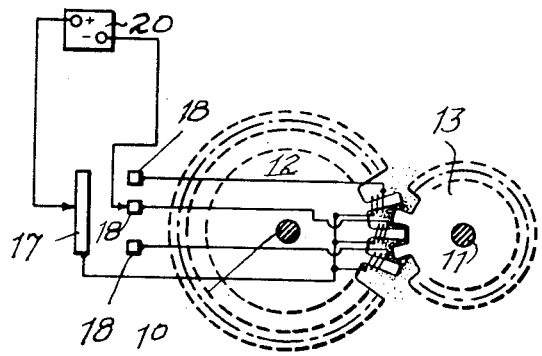
Figure 1 is a side elevation of a pair of mating gears showing one mode of applying a magnetic field in the spaces between the mating teeth of the two gears.

Referring now to the drawings, there is shown in Figure 1 a schematic representation of one mode of applying my arrangement for magnetically cushion packing gear teeth. In this figure are shown at 10 and 11 two shafts on which are mounted the two mating gears 12 and 13, respectively. The gears are provided with square teeth and could not normally be utilized for the transmission of power. However, each tooth of the gear 12 is provided with a winding 14, these windings being utilized to magnetize the teeth 15 successively, as will appear, and thus form a magnetic field across the gap between a tooth 15 of a gear 12 and a tooth of the gear 13. This results in increased viscosity of the iron-oil mixture 16 which is present in the gap (ordinarily as a result of the gears being housed and the housing being filled with a mixture of oil and iron powder or filings). The windings 14 are connected through commutators 17 and 18 in such manner that only that tooth of the gear 12 which is in contact with a tooth of the gear 13 produces a magnetic field and, consequently, the iron-oil mixture between the mating teeth is "hardened" and forms essentially a mating surface for the two teeth so that the teeth drive without backlash and without noise, while at the same time being well lubricated by the oil since, as will be later explained, the iron powder or filings mixed with the oil are wetted by the oil and do not detract but rather add to the lubricating properties of the oil.

In Figure 1 one side of each winding is connected to the commutator or ring 17 which is in turn connected to one side of a source of direct current indicated at 20. The opposite terminals of the windings 14 are connected individually to the commutator segments 18 of which there is a number corresponding to the number of individual windings. The brush which bears upon these commutator segments 18 is connected to the opposite pole of the source of direct current 20. By means of this arrangement, only one tooth of the gear acts as a magnetic pole piece at any given moment, that tooth being the tooth which is in contact with a tooth of the gear 13, a magnetic field being formed, of course, between that energized tooth or pole piece and the two adjacent teeth of the gear 12.

Figure 2:
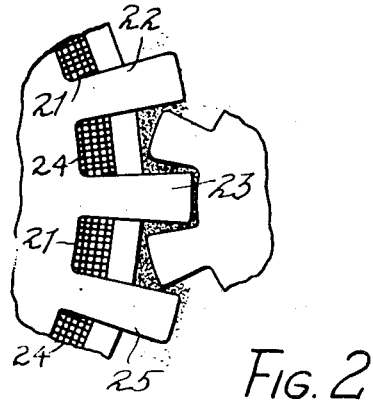
Figure 2 is a fragmentary plan view of a pair of gears showing a modification of the magnetizing method of Figure 1 and illustrating in detail the utilization of gear tooth shapes which would normally be substantially unusable for any but the crudest mechanisms since the tooth shapes would, without the utilization of my invention, produce large amounts of backlash and noise.

In Figure 2 I have shown an enlarged view of two gears similar to those shown in Figure 1. In this instance the arrangement is essentially the same as that indicated in Figure 1 except that the winding arrangement is slightly modified. In this instance winding 21 extends about the two teeth 22 and 23 and a second winding 24 extends about the two teeth 23 and 25. By thus arranging the winding and correspondingly modifying the commutator, the magnetic field is localized between the two teeth on either side of a mating tooth of the other gear thus eliminating any drag resulting from the increased viscosity of the iron-oil material in the tooth space following that which is in mating position.

Figure 3:
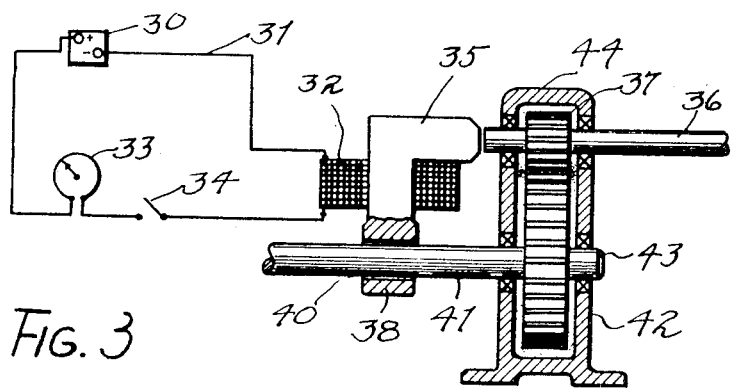
Figure 3 is a vertical cross-sectional view of a pair of mating gears and their housing showing another mode of applying a magnetizing force across the gap formed by the mating teeth of the gear pair.

Figure 3 illustrates a modification of the arrangement heretofore described in which the magnetic field is transmitted through the gear teeth, gear bodies and shafts. In this arrangement, a source of direct current 30 is provided and is connected by means of conductor 31 to a magnet winding 32. The opposite pole of source of current 30 is connected through a rheostat 33 and switch 34 to the second terminal of the magnet winding 32. The magnet comprises the winding 33 already mentioned and a pole piece 35 which at one end terminates in a flat surface adjacent to a shaft 36 on which a gear 37 is mounted. The opposite end of the generally right angle shaped magnet pole piece 35 terminates in an enlarged end 38 which is provided with a bore 40. The shaft 41 extends through the bore 40 and is supported in the housing 42. Within the housing there is mounted on the shaft 41 a gear 43 which meshes with the gear 37. Gear 37 is supported on the shaft 36, as mentioned, and the shaft in turn is supported in bearings 44 in the housing 42. Housing 42 is filled with a mixture of iron filings or iron powder and oil of the type which will be hereinafter described. It will be seen that in the arrangement of Figure 3 the magnetic field exists between the mating teeth of the two gears 37 and 43 and, therefore, in the manner already described the iron-oil mixture may be rendered viscous to a desired extent to form a cushion packing between the driving and driven teeth of the gear to thereby produce a drive which is substantially noiseless and devoid of backlash.

Figure 4:
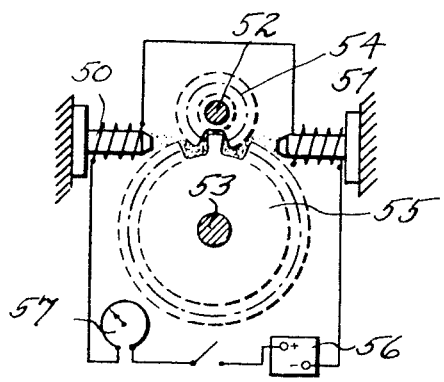
Figure 4 is a fragmentary plan view of a device similar to that of Figure 3 showing a still further mode of applying a magnetizing field in the vicinity of the mating gear teeth.

Figure 4 shows another variation of the mode of cushion packing gears in accordance with my invention. In this instance, the magnetizing force is produced by a pair of magnets 50 and 51 located opposite the mating teeth of the gears and with their axes perpendicular to the axes of the shafts 52 and 53 on which the gears 54 and 55 are mounted. The magnet windings of the magnets 50 and 51 are connected in series with each other and with a source of direct current 56 and a rheostat 57. With this arrangement the magnetic flux flows from the pole piece of the magnet 50 to the pole piece of the magnet 51 and causes a solidifying action on the oil-iron mixture which is present in the tooth spaces of the gears thus assuring a cushion packing about the line of contact of the gears.

Figure 5:
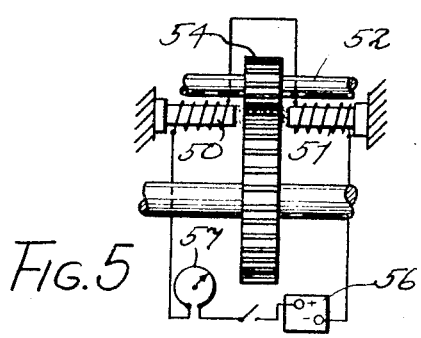
Figure 5 is a further illustration of the practical application of the principle hereinabove discussed.

Figure 5 shows an arrangement essentially similar to that of Figure 4 but with the magnets extending parallel to the shafts so that the lines of force of the magnetic fields are parallel to the gear shafts and the mating surfaces of the gear teeth. In some applications this arrangement is preferable to that of Figure 4 since the magnetic flux can be confined to the area between the driving and driven surfaces of the teeth thereby assuring that no drag will be produced by the solidfying of material about adjacent teeth.

In all of the above described arrangements the material which is utilized is similar to that which has recently been utilized in a clutch developed by the United States Bureau of Standards and which utilizes the same principle which has hereinabove been described.

An oil-iron mixture which I have found to be satisfactory is one which is composed of 89% by weight of carbonyl "E" iron and 11% by weight of a mixture of transformer oil and a wetting or emulsifying agent. The wetting or emulsifying agent in the particular instance was added in proportion of 2% by weight to the oil.

The above proportions of oil, iron and wetting agent are not critical but are merely exemplary of a proportion which operates satisfactorily. The mixture above described has proven satisfactory to transmit at an efficiency of approximately 98% when the reduction was in a ratio of 3 to 1 from the driving shaft to the driven shaft, and the oil-iron mixture has been found to provide adequate lubrication at contact pressures of 100,000 pounds per square inch.

The description above has considered only the use of direct current for energizing electromagnets. It will, however, be understood that alternating current may be utilized with substantially equal effectiveness and particularly where intermittent instantaneous decrease in viscosity or solidification is of no importance.

While I have described preferred forms of my invention, it is obvious that many additional modifications may be devised utilizing the principle of cushion packing the teeth of gears. Consequently, I wish to be limited not by the foregoing description which was given solely for purposes of illustration but, on the contrary, only by the claims granted me.

What is claimed is:

1. A gearing unit comprising a pair of meshing gears, means for supplying a bath of a mixture of oil and a finely divided magnetic material to the gears at least at the contact surfaces of the teeth thereof, and means for applying a magnetic force to the oil mixture at the contact surfaces to thereby render the oil mixture viscous and provide a cushion packing for said meshing gears.

2. A device for cushion packing the teeth of meshing gears comprising means for supplying a bath of a mixture of oil and a finely divided magnetic material to the gears at the mating surfaces thereof, and means for applying a magnetic field to the oil mixture at the mating surfaces of the gears, said last mentioned means serving to magnetize the magnetizable material and render the oil mixture viscous and capable of reducing noise and backlash.

3. A device for cushion packing the teeth of meshing gears comprising a housing about the meshing gears, said housing being filled at least to the level of the meshing gear teeth with a mixture of oil and a finely divided magnetic material, and means for supplying a magnetic field in the region of the meshing teeth of the gears, said magnetic field serving to magnetize the magnetizable material and render the oil mixture viscous.

4. A device for cushion packing the teeth of meshing gears comprising a housing about the meshing gears, said housing being filled at least to the level of the meshing gear teeth with a mixture of oil and a finely divided magnetic material, windings on the teeth of one of said gears, and means to energize at least one winding on the teeth in contact with the other gear, whereby the oil mixture in the region of the mating gear teeth is subjected to a magnetic field and is rendered viscous.

5. A device for cushion packing the teeth of meshing gears comprising a housing about the meshing gears, said housing being filled at least to the level of the meshing gear teeth with a mixture of oil and a finely divided magnetic material, windings on the teeth of one of said gears, and commutator means for electrically energizing the windings on successive teeth as they come into the region of contact to thereby render the oil mixture viscous at and adjacent the contact surfaces of the meshing gears.

6. A device for cushion packing the teeth of meshing gears comprising a housing about the meshing gears, said housing being filled at least to the level of the meshing gear teeth with a mixture of oil and a finely divided magnetic material, an electromagnet having a pole piece of generally right angle shape, said pole piece abutting the end of the shaft on which one of said meshing gears is mounted and surrounding the shaft on which the other of said gears is mounted thereby forming a magnetic circuit through the gear teeth which are in contact, the flux across said mating teeth serving to magnetize the magnetizable material in said oil mixture and render the mixture viscous and capable of transmitting power.

7. A device for cushion packing the teeth of meshing gears comprising a housing about the meshing gears, said housing being filled at least to the level of the meshing gear teeth with a mixture of oil and a finely divided magnetic material, and an electromagnet in the magnetic circuit comprised of said gears and their associated shafts, the magnetic flux flowing between the gears at the contact areas thereof serving to render the oil mixture viscous in the region of the meshing teeth.

8. A device for cushion packing the teeth of meshing gears comprising a housing about the meshing gears, said housing being filled at least to the level of the meshing gear teeth with a mixture of oil and a finely divided magnetic material, and a pair of electromagnets connected in series, the axis of said magnets extending in a direction perpendicular to the faces of the gears, and said magnets being located to produce a flux in the region of the meshing teeth of the gears to thereby render the oil mixture viscous to transmit power from the driving to the driven gear.

9. A device for cushion packing the teeth of meshing gears comprising a housing about the meshing gears, said housing being filled at least to the level of the meshing gear teeth with a mixture of oil and a finely divided magnetic material, and a pair of electromagnets connected in series, the axis of said magnets extending in a direction parallel to the faces of the gears, and said magnets being located to produce a flux in the region of the meshing teeth of the gears to thereby render the oil mixture viscous to transmit power from the driving to the driven gear.

SYDNEY N. BARUCH.

REFERENCES CITED

The following references are of record in the file of this patent:

FOREIGN PATENTS

| Number | Country | Date |
|--------|---------|------|
| 479,784 | France | Feb. 12, 1916 |